Jan. 21, 1936.  C. F. LAMBERT  2,028,223
COVER LOCK
Filed April 17, 1933   3 Sheets-Sheet 1

INVENTOR.
CHARLES F. LAMBERT.
BY
Barnes, Kisselle & Laughlin
ATTORNEYS.

Jan. 21, 1936.  C. F. LAMBERT  2,028,223
COVER LOCK
Filed April 17, 1933  3 Sheets-Sheet 2
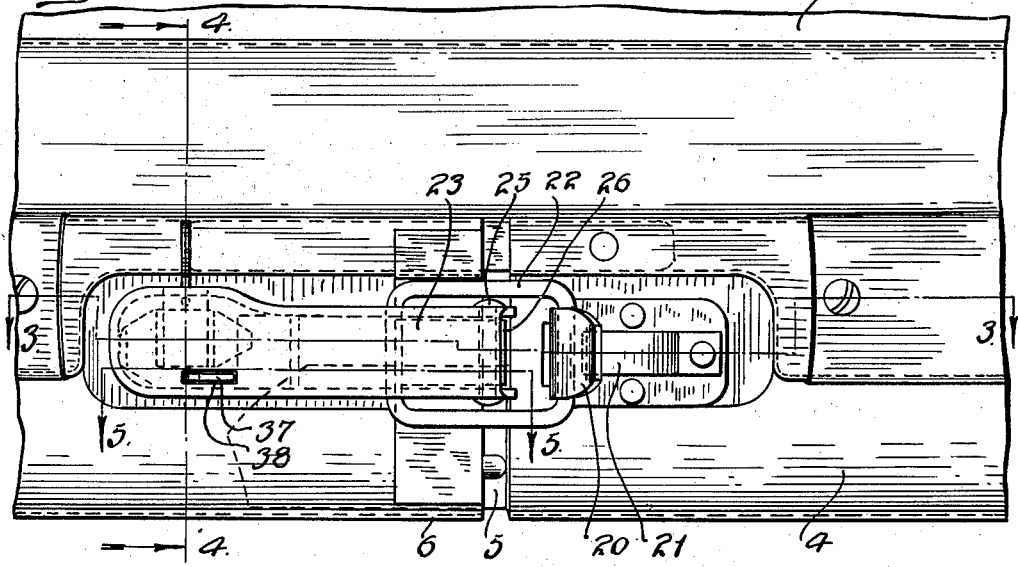
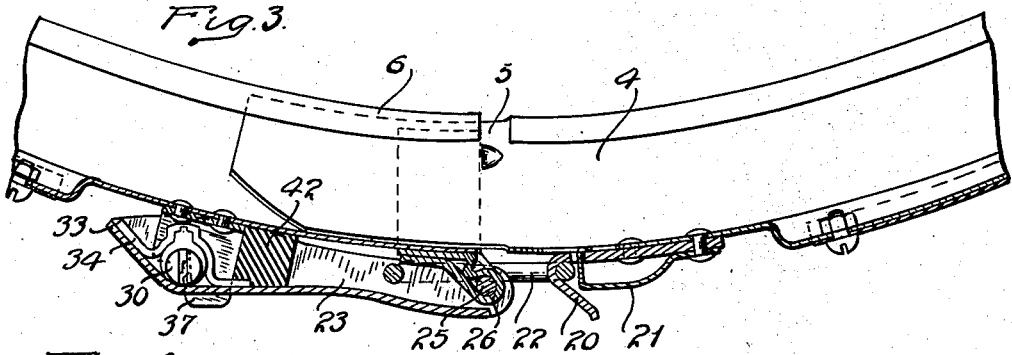
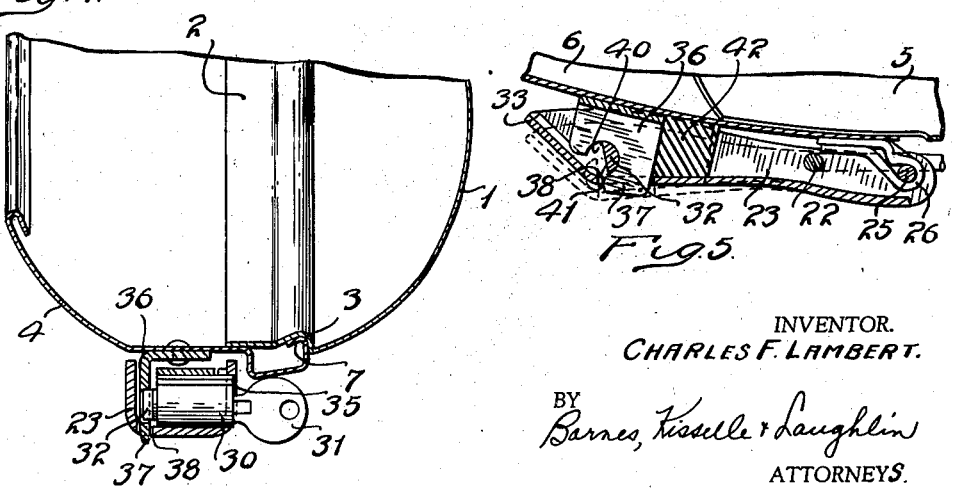
INVENTOR.
CHARLES F. LAMBERT.
ATTORNEYS.

Jan. 21, 1936.                  C. F. LAMBERT                    2,028,223
                                 COVER LOCK
                            Filed April 17, 1933          3 Sheets-Sheet 3

INVENTOR.
CHARLES F. LAMBERT.
BY
Barnes, Kisselle & Laughlin
ATTORNEYS.

Patented Jan. 21, 1936

2,028,223

UNITED STATES PATENT OFFICE 2,028,223

COVER LOCK

Charles F. Lambert, Grosse Pointe Farms, Mich., assignor to Clayton and Lambert Manufacturing Company, Detroit, Mich., a corporation of Delaware Application April 17, 1933, Serial No. 666,523

4 Claims. (Cl. 70—90)

This invention relates to covers for spare tires and/or spare wheels of automotive vehicles. More specifically the invention relates to what has become known as drum type covers, which cover the tire and which have disc-like body portions closing or covering the central opening formed by a tire and covering the wheel if the tire is carried on a wheel.

The invention furthermore, is directed quite definitely to a cover adapted to be used in conjunction with a spare tire and wheel wherein the wheel and tire are carried on the automotive vehicle by suitable supporting means with the cover fitted on the tire and carried thereby. Arrangements of this kind at the present time are designed so that the spare wheel is mounted at the hub. One of the objects of the present invention is the provision of a cover which, while in itself carried by the spare tire or wheel, serves as a theft proof device for preventing removal of the spare tire and wheel. Accordingly, the drum type cover encloses the mounting means at the hub and locking means are provided for locking the cover in place on the tire.

In the acompanying drawings:

Fig. 2 is an enlarged view looking substantially on line 2—2 of Fig. 1 showing the latching arrangement.

Fig. 3 is a sectional view taken on line 3—3 of Fig. 2.

Fig. 4 is a sectional view taken substantially on line 4—4 of Fig. 2.

Fig. 5 is a sectional view taken substantially on line 5—5 of Fig. 2 illustrating a lock arrangement.

Figure 1:
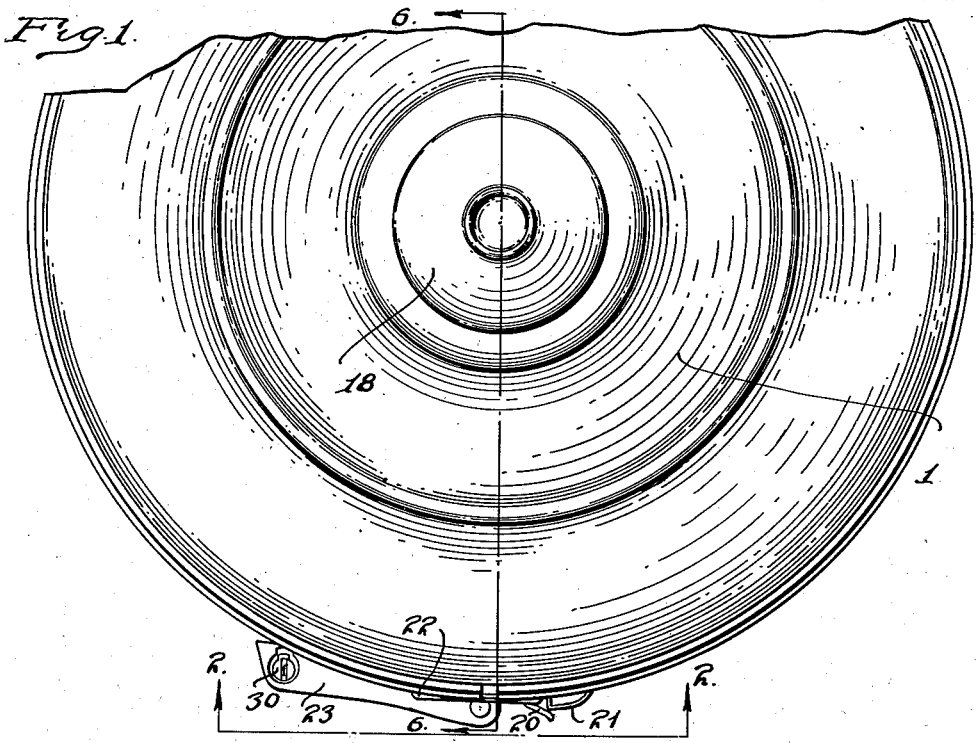
Fig. 1 is a rear elevational view of a portion of a tire cover constructed in accordance with the invention showing one form of hub portion design.
Figure 6:
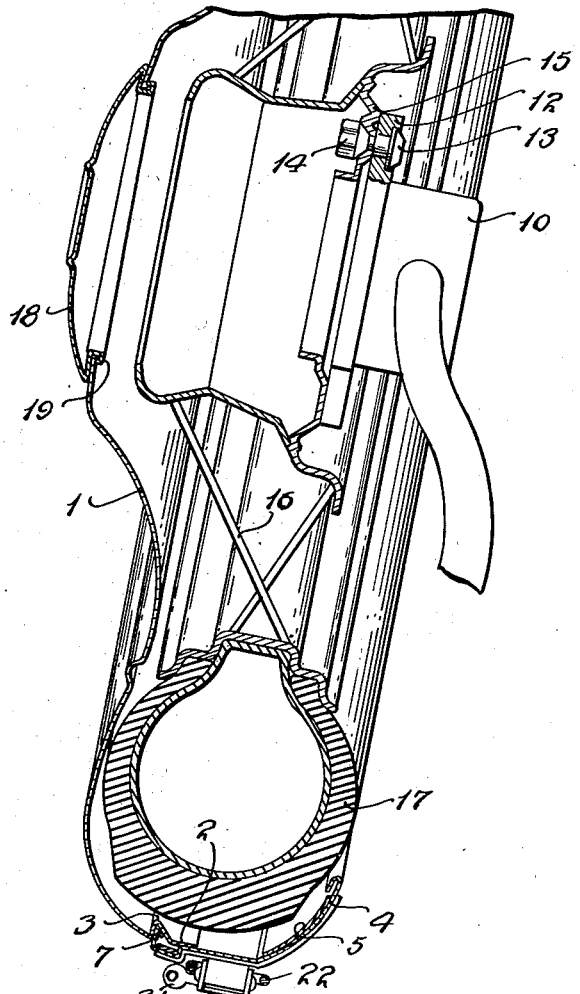
Fig. 6 is a sectional view through the cover shown in Fig. 1 taken substantially on line 6—6 and illustrating a portion of the wheel, and its mounting.

Referring now to Figs. 1 and 6: The cover comprises a drum like body portion 1 which has a rim part 2 (Fig. 4) for fitting over the periphery of the tire, which part may be fashioned to form a circumferential groove 3. Another and separable part 4 is provided which is of split ring form having telescoping ends 5 and 6 (Fig. 3) and which has an edge portion 7 designed to be fitted into the groove 3. Suitable latching means are provided for holding the ends 5 and 6 in proper overlapping position but this will be later described. The cover thus far described may be substantially the same as the cover in Patent No. 1,900,822.

A spare wheel support is illustrated at 10 to which the hub 11 of the wheel is designed to be attached. This may be effected by means of a flange 12 on the wheel support carrying studs 13 for the reception of nuts 14. The studs 13 pass through apertures in an internal flange 15 of the hub and the nuts hold the wheel in place. The wheel may be of any conventional design and as shown is a spoked wheel having spokes 16, and the tire is shown at 17.

In the above mentioned patent the cover has a removable hub portion which permits access to the securing nuts, and by removing the hub portion of the drum type cover, the wheel and cover may be taken off of the support. As shown in Fig. 6 the drum cover may have a central or hub portion 18. This may be of any conventional design and may, as shown in Fig. 1, take the appearance of an ordinary hub, and it is permanently attached to the cover as shown at 19. Thus no access can be had to the holding nuts 14 short of destroying the cover. It will be appreciated, therefore, that if the cover is locked onto the tire the spare tire wheel cannot be removed.

One end of the part 4 (Fig. 3) may have a hook member 20 secured thereto and it may be provided with a spring snap 21 and a ring or loop member 22 may be caught behind the hook 20 and held therein by the spring snap member. This loop has a portion which extends through a toggle lever 23 carried by the end 6. This toggle lever may be a stamping of U-shape in cross section as illustrated in Fig. 4 and it may be pivoted as at 25 to a bracket 26 secured to the end 6. It will be understood that the loop 22 may swivel in its connection with the toggle lever 23.

This toggle lever may carry a cylinder lock 30 operable by a key 31 and the lock may be provided with an eccentric member 32 turnable by the key. The cylinder may be held in the channel portion of the U-shaped toggle lever by a holding member 34 (Fig. 3) shaped around the cylinder and adequately secured by welding or the like to the lever, and one side of the channel lever may be provided with an aperture as illustrated at 35 to expose the lock and for access of the key.

A suitable member is attached to the rim portion to hold the toggle lever in closed position and this, as shown in Fig. 4, may take the form of an L-shaped bracket 36. The bracket may have a part 37 for projecting through a slot 38 in the lever for properly aligning the two parts, that is, the member 36 and the lever. The member also may have an aperture 40 (Fig. 5) which is open at one side for the reception of the member 32. The surfaces of this opening and the surface of the member 32 are preferably such as to fit each other, that is to say, they are formed with similar curves, and the member 32, as illustrated in Fig. 5, is positioned eccentrically of the cylinder lock. Accordingly, when the lever is placed over the holding member 36, with the lock in what may be termed unlocked position, the member 32 is generally in the dotted-line position in Fig. 5. In turning the key the member 32 moves clockwise and ultimately takes the position shown in Fig. 5.

In this action the eccentricity of the lock member 32 urges the lever 23 securely into locked position as for example, from the dotted-line position of this member to the full-line position as illustrated in Fig. 5. The holding member 36 is preferably provided with a stop lug 41 against which the eccentric locking member 32 is designed to abut when the parts are in their final locked position. In order that the lever may be further held securely and prevented from movement or rattling during operation, compressible means may be provided which is compressed by the action of the eccentric lock member 32 drawing the lever toward the carrier. This compressible means may take the form of a rubber block 42 secured to the inside of the lever 33 and adapted to contact with the peripheral portion of the part 4 of the cover. This rubber block is compressed tightly against the part 4 when the eccentric is being turned in its socket and thus all parts are solidly held together. It will be readily appreciated how the cover may be removed by unlocking the cylinder lock, swinging the lever 23 counter-clockwise as Fig. 4 is viewed to permit spreading of the ends 5 and 6 of the member 4, thus increasing the diameter of the member 4 so that its part 7 may be disengaged from the recess 3. A reverse action takes place in securing the cover to the tire.

Figure 7:
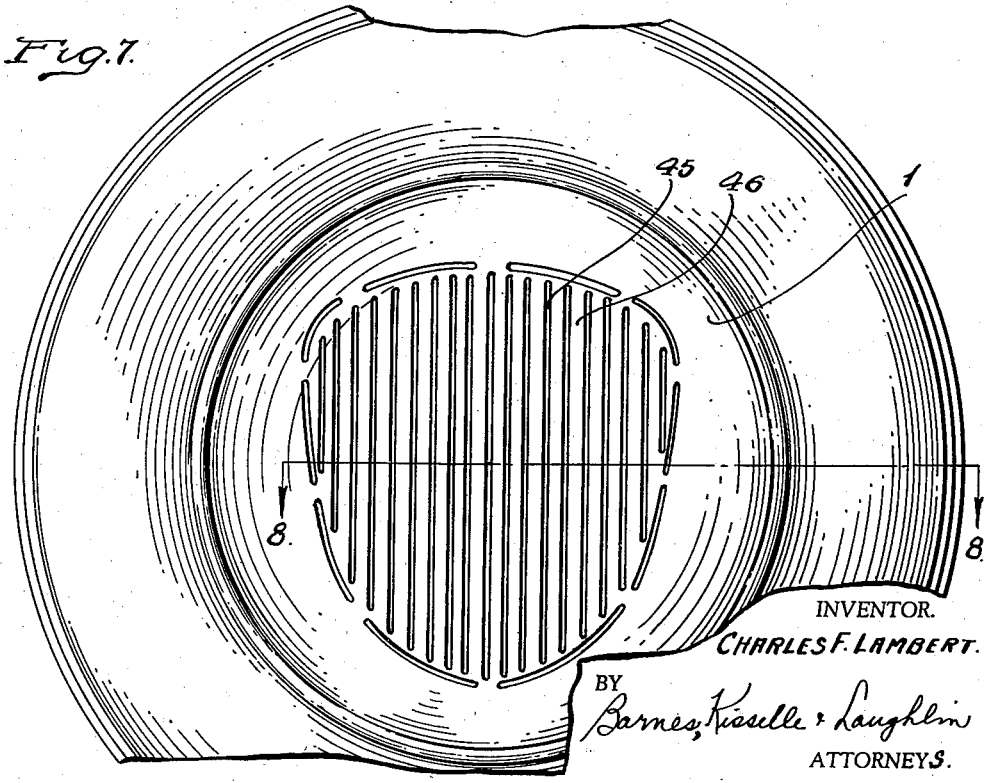
Fig. 7 is a rear elevational view of another form of tire cover.
Figure 8:
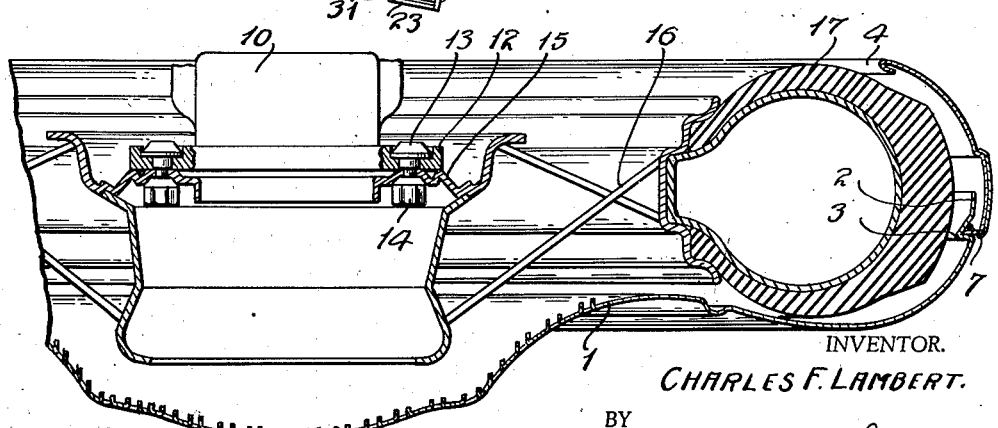
Fig. 8 is a sectional view taken substantially on line 8—8 of Fig. 7.

The drum part of the cover, instead of being provided with a separate hub portion, as illustrated in Fig. 6, may have the center portion integral therewith as shown in Figs. 7 and 8. Furthermore, any suitable shape or design may be incorporated in the drum, as for example, the one shown in Figs. 7 and 8. In this form the drum, by suitable dies, has been provided with a grill formation having bars 46 and spaces 45. The contour of the grill formation may correspond to shapes used on other parts of a particular vehicle, as for example, the radiator. Accordingly, an automobile manufacturer who has adhered to a particular form of radiator which is well-known and which may in fact constitute a trademark, may have the same shape in the form of a grill matching the radiator provided in the drum cover. It will be appreciated also that the separate hub member, such as illustrated in Figs. 1 and 6, may be provided with any desirable configuration or ornamentation, or have any desired contour.

I claim:

1. A lock structure for a tire cover having a cover member in the form of a split ring, comprising a toggle lever pivoted to one end of the ring, a link connecting the lever to the opposite end of the ring, a holding member secured to the first mentioned ring end and provided with an aperture, a key operated lock device carried by the lever, an eccentric lock member movable into the aperture upon actuation of the lock adapted to urge the lever toward the ring member in the turning of the lock.

2. A lock structure for a tire cover having a cover member in the form of a split ring, comprising a toggle lever pivoted to one end of the ring, a link connecting the lever to the opposite end of the ring, a holding member secured to the first mentioned ring end and provided with an aperture, a key operated lock device carried by the lever, an eccentric lock member movable into the aperture upon actuation of the lock and adapted to urge the lever toward the ring member in the turning of the lock, and a stop member adjacent the aperture on the holding member against which the eccentric member is adapted to engage when in fully locked position.

3. In a tire cover, a cover member in the form of a split ring, a toggle lever pivoted to one end of the ring, a link connecting the lever to the opposite end of the ring, a holding member secured to the first mentioned ring end and provided with an aperture, a key operated lock device carried by the lever, an eccentric lock member movable into the aperture upon actuation of the lock and adapted to urge the lever toward the ring member in the turning of the lock, and a compressible element carried by the lever adapted to engage the peripheral portion of the ring and adapted to be compressed when the eccentric member is turned into the aperture whereby the lever is held snugly against movement.

4. In a tire cover, a cover member in the form of a split ring, a toggle lever pivoted to one end of the ring, a link connecting the lever to the opposite end of the ring, a holding member secured to the first mentioned ring end and provided with an aperture, a key operated lock device carried by the lever, an eccentric lock member movable to the aperture upon actuation of the lock and adapted to urge the lever toward the ring member in the turning of the lock, a compressible element carried by the lever adapted to engage the peripheral portion of the ring and adapted to be compressed when the eccentric member is turned into the aperture whereby the lever is held snugly against movement, and a stop member adjacent the aperture against which the eccentric member is adapted to abut in fully locked position.

CHARLES F. LAMBERT.